United States Patent
Bauchot et al.

(10) Patent No.: US 6,229,807 B1
(45) Date of Patent: May 8, 2001

(54) PROCESS OF MONITORING THE ACTIVITY STATUS OF TERMINALS IN A DIGITAL COMMUNICATION SYSTEM

(76) Inventors: Frederic Bauchot, 299 Chemin du Vallon La Tourraque, 06640 Saint Jeannet; Gerard Marmigere, Quartier le Patrimoine Haut, 06430 Drap, both of (FR)

(*) Notice: Subject to any disclaimer, the term of this patent is extended or adjusted under 35 U.S.C. 154(b) by 0 days.

(21) Appl. No.: 09/018,587

(22) Filed: Feb. 4, 1998

(51) Int. Cl.[7] .............................. H04L 12/28; H04L 12/56
(52) U.S. Cl. ...................... 370/395; 370/338; 370/346; 370/449
(58) Field of Search ...................... 370/242, 252, 370/254, 255, 346, 349, 449, 328, 329, 330, 338, 341, 347, 348, 431, 458, 461, 462, 395, 468

(56) References Cited

U.S. PATENT DOCUMENTS

| | | | |
|---|---|---|---|
| 5,805,586 | * 9/1998 | Perreault et al. | 370/346 |
| 5,903,557 | * 5/1999 | Johansson et al. | 370/349 |
| 5,939,999 | * 8/1999 | Ohgaki | 340/825.08 |
| 6,002,680 | * 12/1999 | Sierens et al. | 370/344 |
| 6,058,106 | * 5/2000 | Cudak et al. | 370/313 |

* cited by examiner

*Primary Examiner*—Ajit Patel

(57) ABSTRACT

In a digital communication system comprising a primary station and a plurality of secondary stations remote from the primary station and in which the primary station exchanges data with the secondary stations which are currently associated; a process of sequentially monitoring the activity status of each one of the associated secondary stations under the control of the primary station, comprising the steps of a) determining (12) that the monitored secondary station is still currently associated, b) determining (16) whether any data from the monitored secondary station have been received by the primary station, c) if not, transmitting (24) to the monitored secondary station invitations to send back a message "I am alive", and d) initiating (20) a routine for de-associating the monitored secondary station if the number of the invitations transmitted thereto reaches a predetermined number without the monitored secondary station sending back said message.

8 Claims, 2 Drawing Sheets

Figure 1:
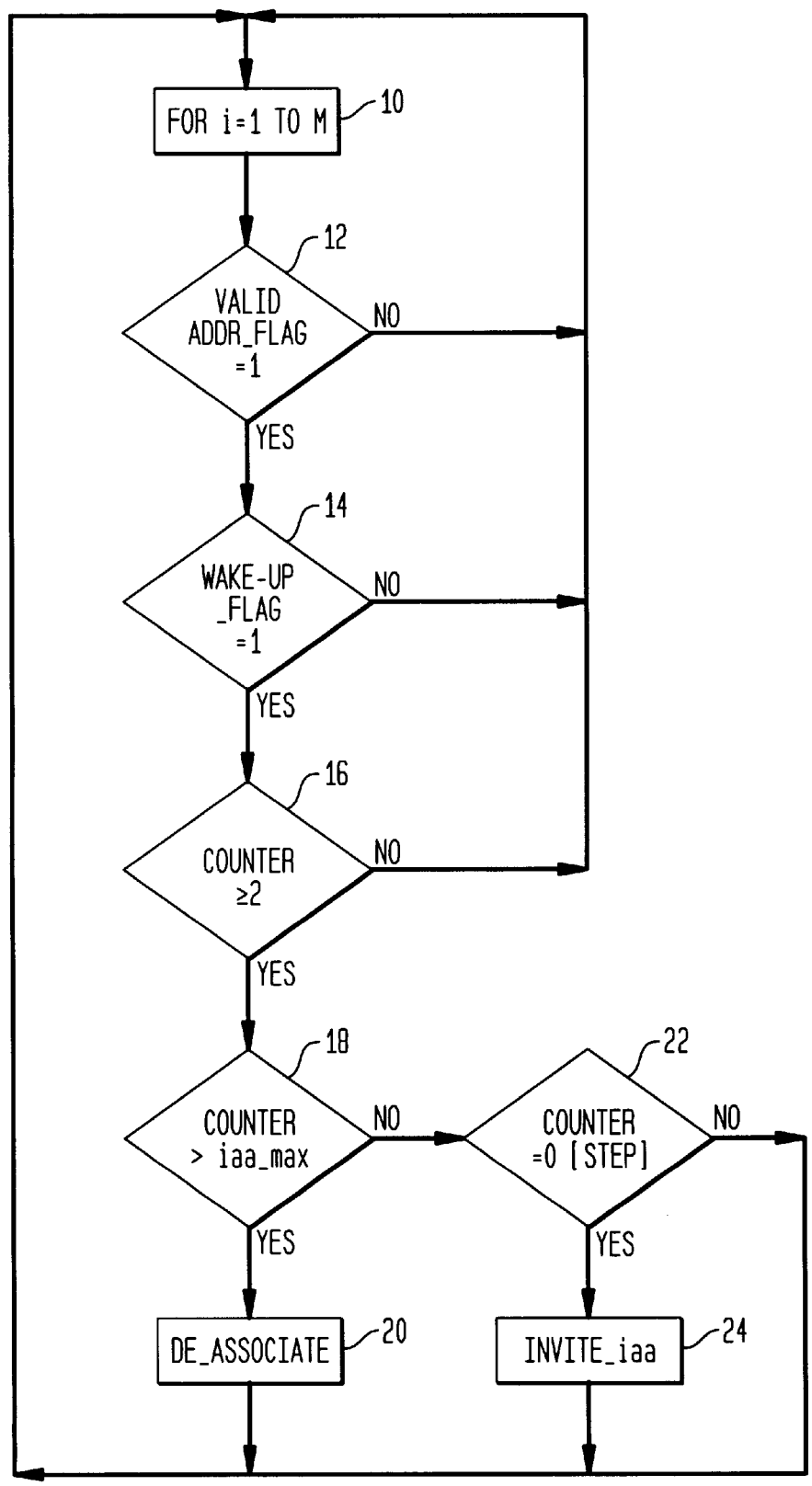

PROCESS OF MONITORING THE ACTIVITY STATUS OF TERMINALS IN A DIGITAL COMMUNICATION SYSTEM

TECHNICAL FIELD

The invention relates to a process of monitoring the activity status of terminals in a digital communication system and relates in particular to the control by a primary station of a digital communication system whether the secondary stations in the system are still alive.

BACKGROUND

In any communication environment including a central equipment and a plurality of remote equipments, especially in digital communication systems operating in multipoint, the central equipment has to control frequently the presence of each remote equipment. Indeed, in any hierarchical system, internal resources are allocated for each remote equipment. The management of such resources must be performed as rapidly as possible after use, as soon as the remote equipment disappears. Such resources can be control blocks, traffic queues, timers, semaphore software . . . As the total resources of the central equipment are size limited, the non-release of unused resources can result in refusing to serve new remote equipments.

A classical method to avoid such a drawback consists for the central equipment to poll successively the remote equipments and invite them to transmit an information confirming they are alive. Unfortunately, the polling protocol results in an overhead, that is the portion of bandwidth consumed to implement the protocol, which is all the more important since the time required to detect that a remote equipment has disappeared is short.

SUMMARY OF THE INVENTION

Accordingly, the primary object of the invention is to provide a process of monitoring, in a digital communication system comprising a primary station and a plurality of secondary stations, the activity status of each secondary station which enables to discover whether a station has to be disconnected in a minimum of time although the resulting overhead remains limited.

The process of the invention consists for the primary station in determining that each monitored secondary station is still currently associated, determining whether any data from the monitored secondary station have been received by the primary station, and if not, transmitting to the monitored secondary station invitations to send back a message "I am alive", at last initiating a routine for de-associating the monitored secondary station if the number of the invitations transmitted thereto reaches a predetermined number without the monitored secondary station transmitting such a message.

DESCRIPTION OF THE INVENTION

The foregoing, other objects and advantages of the invention will be better understood from the following description of the preferred embodiment of the invention with reference of the accompanying figure representing the flow diagram of the invention process.

The invention is hereafter described in an environment wherein an Access Point (AP) acts as a primary station interfacing an Asynchronous Transfer Mode (ATM) network with a plurality of Mobile Terminals (MT) connected to the Access Point by a wireless communication channel such as described in EP patent application No. 96 480047.8 filed on Apr. 23, 1996, and entitled "Medium access Control Scheme for a Wireless Access to an ATM Network".

But, it must be noted that the invention can be implemented in any digital communication system wherein a central equipment has to control a plurality of remote equipments. A typical system of this type is a communication network wherein a server has to monitor the presence of end customers.

The basis of the invention is for the AP to invite at some regular instants each associated MT to send a message "I am alive" (iaa) back to the AP by means of MAC Protocol Data Units (MPDU). If the solicited iaa is not received by the AP when expected, a new invitation is done as soon as possible, up to a predefined number of retries iaa-max. If this maximum is reached, then a de-association procedure must be initiated.

Within the AP is defined a first table (T1) containing some information relevant to associated MT. The size of this table is equal to the maximum number of simultaneously associated MT: T1_LGTH which is assumed to be equal to 256. Each entry of this table records information for the MT whose MAC_addr is equal to the entry index. It consists to the following fields:

valid_addr_flag specifying if a MT with an address equal to the corresponding index is currently associated. Default value for this field is 0 (address not associated).

wake_up_flag specifying if the MT with MAC_addr equal to the corresponding index is currently "waked up" or in power saving or alternate frequency channel investigation mode. Default value for this field is 1 (when the terminal is awake)

counter (char) specifying how many times the iaa MPDU invitation is done before successfully reception of iaa. When equal to zero, this counter specifies that the iaa MPDU has been successfully received.

Within the AP is defined a second table (T2) with M entries, if M represents the current number of associated MT. Each entry in this table T2 is the address of a MT, and can thus be used as an index to table T1.

Each N time slots, a variable poll_index is incremented (wrap around to zero when T1_LGTH is reached, and T1(poll_index) counter is incremented $$T1(poll\_index).counter=T1(poll\_index).counter+1$$

At each new time frame, the scheduler in the AP verifies for each associated MT that the fields of the entry of T1 corresponding to the MT address are different of 0, that is valid_addr_flag≠0 wake_up_flag≠0 counter≠0 then, it increments the counter of the monitored MT and checks whether the incremented counter is greater than iaa_max+1; if so, a procedure for de-associating the MT is initiated. Otherwise, a new invitation to send back the message iaa is transmitted to the MT.

If the AP successfully receives the iaa message transmitted by a MT whose the address is equal to m, the AP resets the corresponding counter:

$$T1(m).counter=0$$

At this point of the description, it is necessary to consider two antagonist parameters.

a) The first one is the Discovery Time (DT) corresponding to the time required to detect that a MT has disappeared. The maximum value of DT corresponds to the worst case situation where a MT disappears just after a successful iaa transmission, and the minimum value of DT corresponds to the best case situation where a MT disappears just before an iaa transmission.

b) The second parameter is the Protocol Overhead (PO) corresponding to the portion of the bandwidth consumed to exchange the iaa from the MT to the AP. Its maximum value corresponds to the worst case situation where the iaa is successfully received at the last allowed retry, and the minimum value corresponds to the best case situation where the iaa is successfully received at the first try.

It is easy to verify that the main factor affecting the discovery time (for a given value of protocol overhead) is the number of associated MT. When the number M of associated MT is quite small, then the parameter N becomes also small so that a short discovery time can be reached. Inversely, if the number M of associated MT becomes quite large, then the parameter N becomes also large so that the discovery time can significantly increase.

The proposed strategy is to make sure that the protocol overhead remains below a given threshold PO_threshold (1/1000 for instance), while the iaa periodicity is adjusted so that the resulting discovery time does not exceed another pre-determined value DT_threshold. Priority is given to the smallest possible discovery time so that any AP can quickly realize that a MT has disappeared. It has been verified that such a strategy can be followed if the number of MT is such that $$M < 2PO\_threshold * (DT\_threshold - n*iaa\_max)/s$$

wherein n is the average number of time slots in a time frame exchanged between the AP and the MT, and s is the number of time slots required to transmit the message iaa.

| | |
|---|---|
| For example, with | PO_threshold = 1/1000 |
| | DT_threshold = 2.1s or 100 000 time slots |
| | n = 16 |
| | iaa_max = 8 |
| | s = 2 |
| the value of M is such that | M<99.8 |

Therefore, the performance results (DT and PO) significantly depend on the number M of currently associated MT. One way to alleviate this dependency is to adopt a strategy where the iaa invitation periodicity is adaptively changed according the current size and the traffic handling activities of the MT population. Another consideration is that the iaa_max parameter is related to the maximum fading duration. Indeed, if the number iaa_max of retries is chosen too small, then there is a risk that a MT suffering temporarily from fading conditions may erroneously be seen as dead. It is then necessary to adjust the maximum duration of successive retries so that this duration exceeds the maximum duration during which the MT seems dead in view of some fading problem (for example during 1.3 ms).

From these considerations, an approach of the invention consists in artificially reducing the number of "invited" MT, while taking more efficiently into account the reception of any MPDU to detect the presence of an associated MT, and which demultiplicates by a factor "STEP" the iaa transmission, allowing to cope with larger fading duration, still keeping the protocol overhead unaffected. Implementation constraints may lead to use a value of "STEP" equal to a power of 2 (2,4,8 . . . ).

If the AP successfully receives any message (iaa message or others) transmitted by a MT whose the address is equal to m, the AP resets the corresponding counter:

$$T1(m).counter=0$$

Doing this way, the population of invited MT is reduced to the MT's which do not transmit any traffic to the AP.

Figure 2:
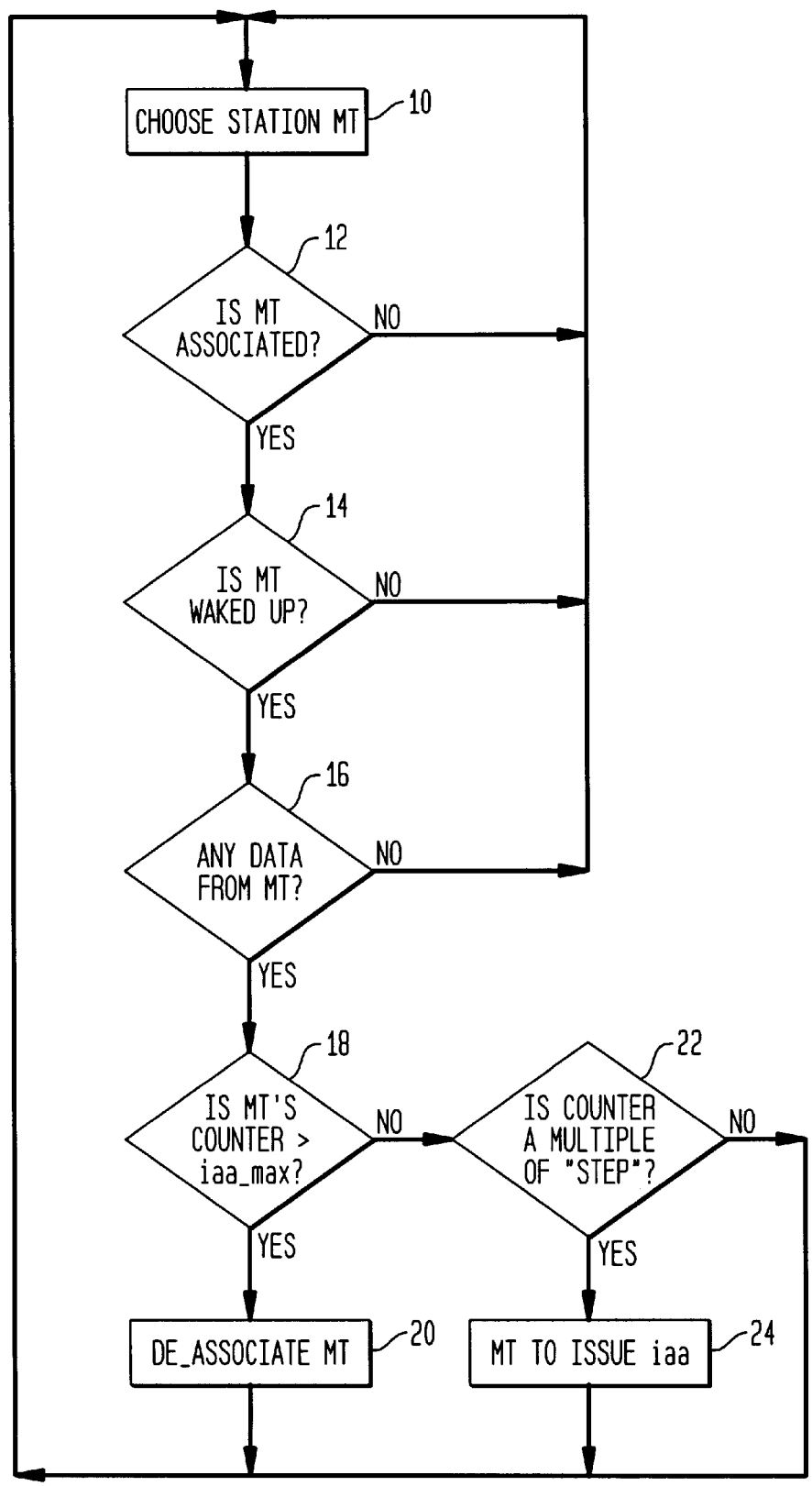

Accordingly, the process according to the invention comprises the following steps as illustrated in the accompanying FIGS. 1 and 2.

1 At each new frame the scheduler of AP performs the process for i=1 to M (10).

2 The scheduler verifies first that the monitored MT is currently associated, that is valid_addr_flag is equal to 1 (12); secondly that the monitored MT is awake, that is wake_up_flag=1(14) and thirdly that the counter associated to the monitored MT is not 0 or 1, that is counter$\geq$2 (16). It must be noted that the counter value to be checked is 2 and not 1. Indeed, while the counter is reset to 0 upon reception of any valid MPDU from the monitored MT (data or iaa message), the counter could be incremented to 1 without being followed by traffic when it is checked by the scheduler. Note that, if any one of these checks, (steps 12,14,16) is not verified, the scheduler returns to the beginning of the process with i being incremented.

3 Then, the scheduler checks whether the value of the counter of the monitored MT is greater than iaa_max (18)

4 If the counter value is >iaa_max, then the de-associate routine is called to initiate the de-association procedure of the monitored MT (20). After this routine has been run, the process is started again with i being incremented.

5 If the counter value is <iaa_max, the scheduler checks whether the counter value is a multiple of STEP, that is counter=0[STEP] (22). If not, the scheduler returns to the beginning of the process with i being incremented.

6 If the counter value is a multiple of STEP, the invite_iaa routine is called to invite the monitored MT to issue the iaa message (24). After this routine has been run, the process is started again with i being incremented.

It must be noted that the value of the counter associated to a monitored secondary station is incremented each time an invitation is transmitted to the station.

What is claimed is:

1. In a digital communication system comprising a primary station and a plurality of secondary stations remote from the primary station and in which the primary station exchanges data with the ones of said plurality of secondary stations which are currently associated with said primary station; a process of sequentially monitoring the activity status of each one of the associated secondary stations under the control of said primary station, said process being characterized by the steps of:

a) determining (12) that the monitored secondary station is still currently associated b) determining (16) whether any data from said monitored secondary station have been received by said primary station c) if not, transmitting (24) to said monitored secondary station invitations to send back a message "I am alive", d) initiating (20) a routine for de-associating said monitored secondary station if the number of said invitations transmitted thereto reaches a predetermined number without said monitored secondary station sending back said message, wherein step c) comprises the step of checking (22) whether the number of said invitations to send back a message "I am alive" is divisible by a factor which is selected based upon fading conditions of said monitored secondary station and transmitting a new invitation to said monitored secondary station only if this number is divisible by said factor.

2. Process according to claim 1 further comprising a step a1) consisting in determining (14) whether the monitored secondary station which is currently associated is also currently in a "waked up" activity status.

3. Process according to claim 2, wherein a new one of said plurality of secondary stations is monitored if any one of said determinations steps a), a1) or b) is not met.

4. Process according to any one of claims 1 to 3, wherein a new one of said secondary station is monitored after either said routine for de-associating is initiated or a new invitation is transmitted to said secondary station being monitored.

5. Digital communication system comprising a primary station and a plurality of secondary stations remote from the primary station and in which the primary station exchanges data with the ones of said plurality of secondary stations which are currently associated with said primary station and wherein said primary station includes control means for sequentially monitoring the activity status of each one of the associated secondary stations; said system being characterized in that said control means are composed of:

a) means for determining that the monitored secondary station is still currently associated b) means for determining whether any data from said monitored secondary station have been received by said primary station, c) means for transmitting to said monitored secondary station invitations to send back a message "I am alive" if no data from said monitored secondary station have been received by said primary station, d) means for initiating a routine for de-associating said monitored secondary station if the number of said invitations transmitted thereto reaches a predetermined number without said monitored secondary station sends back said message, wherein said means c) for transmitting invitations to said monitored secondary associated station comprise means for checking whether the number of said invitations to send back a message "I am alive" is divisible by a factor which is selected based upon fading conditions of said monitored secondary station and transmitting a new invitation to said monitored secondary station only if this number is divisible by said factor.

6. System according to claim 5, further comprising means for determining (14) whether the monitored secondary station which is currently associated also currently has a "waked up" activity status.

7. System according to any one of claims 5 or 6 comprising a digital communication system comprising: a first network based on an asynchronous transfer mode and including at least one asynchronous terminal, a second network based on a synchronous transfer mode and including said plurality of secondary stations and said primary station having a transceiver for controlling the exchange of data consisting in communicating data from said at least one asynchronous terminal to one of said plurality of secondary stations and data from one of said plurality of secondary stations to said at least one asynchronous terminal.

8. System according to claim 7, wherein said first network based on asynchronous transfer mode is an ATM network and said second network based on synchronous transfer mode is a wireless network.

* * * * *